United States Patent Office 3,629,157
Patented Dec. 21, 1971

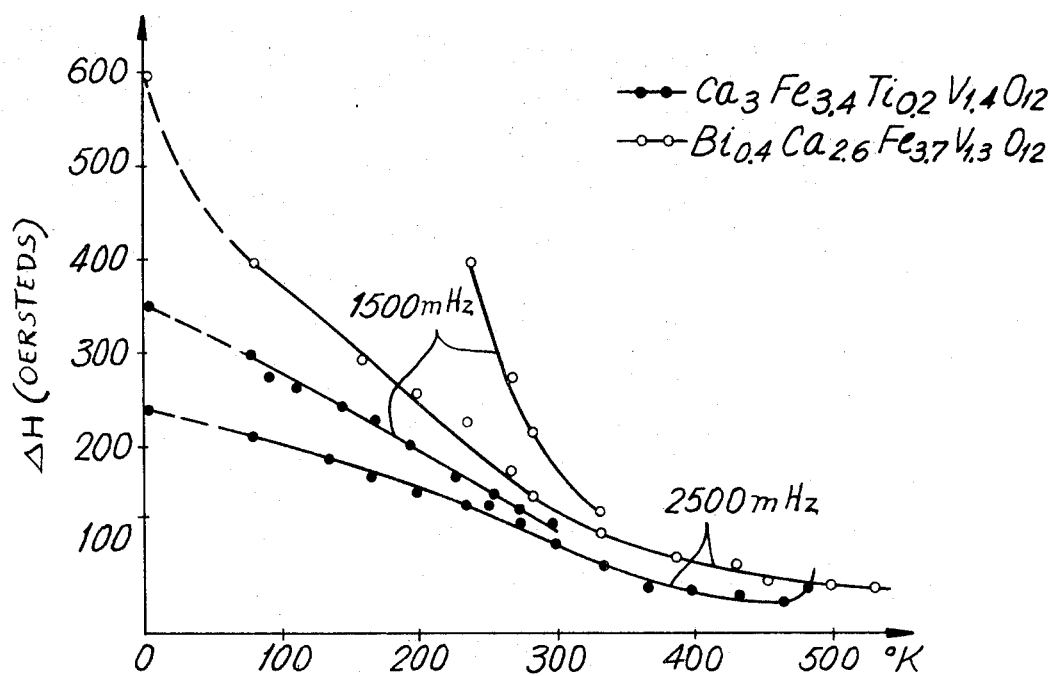

3,629,157
FERRITE AND METHOD OF MANUFACTURING THE SAME
Marina Anatolievna Kharinskaya, Ul. Bukharestskaya 31, korp. 4, kv. 85, and Alexei Ivanovich Obraztsov, prospekt Ju. Gagarina 85, kv. 35, both of Leningrad, U.S.S.R.
Filed July 23, 1969, Ser. No. 843,974
Int. Cl. C04b 35/00, 35/46
U.S. Cl. 252—62.59     2 Claims

ABSTRACT OF THE DISCLOSURE

Ferrite prepared from a stock mixture constituted of iron, calcium, vanadium and titanium oxides taken in the following proportions (mole percent):

| | |
|---|---|
| Ferric oxide, $Fe_2O_3$ | 31.0–26.3 |
| Calcium oxide, CaO | 54.0–50.8 |
| Vanadium pentoxide, $V_2O_5$ | 13.1–9.3 |
| Titanium dioxide, $TiO_2$ | 13.6–1.8 | and a method for the manufacture of said ferrite.

The ferrite thus prepared may find application for developing and manufacturing super-high frequency ferrite devices operating in the decimetric wave band under low-temperature conditions (77° K.; 4.2° K.).

---

This invention relates to materials employed in radio engineering and, more particularly, to ferrites useful for making super-high frequency ferrite devices operating in the decimetric wave band under low-temperature conditions, and to methods of manufacturing the same.

At present, in cooled super-high frequency devices use is made of materials containing yttrium garnet or calcium-vanadium-bismuth garnet-type ferrites having a magnetization of at least 600 gauss (at 300° K.) or 1,000–1,100 gauss (at 4.2° K.).

However, with increasing wave lengths the super-high frequency devices call for the employment of ferrites having a lower value of saturation magnetization. Super-high frequency ferrites (yttrium-substituted or CaVBi) noted for their low value of magnetization at the saturation point (about 500–400 gauss) have very wide resonance curves at low temperatures due to significant anisotropy fields (2K/M, wherein K is the constant of magnetocrystal anisotropy, and M stands for magnetization at the saturation point), so that said ferrites are unsuitable for use in long-wave super-high frequency devices operating in weak fields.

It is an object of the present invention to eliminate the above-mentioned disadvantages.

It is a further and more specific object of the present invention to provide a material having a low value of saturation magnetization and an adequately narrow resonance curve which will be useful under low temperature conditions in the decimetric-wave band.

These objects have been accomplished by the provision of a ferrite material prepared from a stock mixture which, in addition to iron, calcium and vanadium oxides, contains, according to the invention, titanium dioxide.

The figure represents resonance width vs. temperature graphs of a ferrite of the invention and a ferrite of the prior art.

It is preferable to use a stock mixture containing the following proportions of the components, mole percent:

| | |
|---|---|
| Ferric oxide, $Fe_2O_3$ | 31.0–26.3 |
| Calcium oxide, CaO | 54.0–50.8 |
| Vanadium pentoxide, $V_2O_5$ | 13.1–9.3 |
| Titanium dioxide, $TiO_2$ | 13.6–1.8 |

To prepare the ferrite of the invention, said components, on being mixed, should preferably be calcined at a temperature of 1,000–1,020° C. for a period of 4 hours, cooled down and ground, followed by reheating the mixture at 1,050–1,070° C. for 4 hours, cooling it down and grinding once more, subjecting the ground mixture to compression molding and sintering the molded material at 1,170–1,200° C. for 20 hours in an oxidizing atmosphere.

The ferrite material thus prepared is useful for developing and manufacturing super-high frequency ferrite devices operating in the decimetric wave band under low temperature conditions (77° K. and 4.2° K.).

The present invention is illustrated hereinbelow by the description of an exemplary embodiment thereof with reference to an accompanying drawing in which is shown a resonance curve width vs. temperature graph for the ferrites of the invention.

The present ferrite material has the following analysis:

$$Ca_3Fe_{3.5-x}Ti_{2x}V_{1.5-x}O_{12}$$

wherein $x$ varies from 0.05 to 0.4.

Titanium dioxide is incorporated into the stock mixture in order to improve temperature dependence of the resonance curve width and also to minimize the saturation magnetization of the desired ferrite. The ferrites of the invention are prepared by a method which is identical to conventional ceramic industry processes. The stock mixture components consist of $Fe_2O_3$, $V_2O_5$, $TiO_2$ and CaO. The sintering temperature of these materials varies in the 1,170–1,200° C. range.

Given hereinbelow is an example of preparing a ferrite material, according to the invention. It will be readily understood by those skilled in the art that the example is presented by way of illustration and does not limit the instant invention which is intended to be limited only by the appended claims.

EXAMPLE

Composition of the stock mixture, mole percent:

| | |
|---|---|
| $Fe_2O_3$ | 30.35 |
| CaO | 53.57 |
| $V_2O_5$ | 12.50 |
| $TiO_2$ | 3.58 |

Weighed amounts of the oxides were mixed in a vibrating mill for 2 hours in ethanol, the charge:balls:ethanol ratio being 1:7:0.75. The mixture thus prepared was dried and subjected twice to preliminary calcination at temperatures of 1,000–1,020° C. and 1,050–1,070° C., each calcination step being carried out for a period of 4 hours and the mixture being ground after the first and the second calcination step for a period of 2 hours in a vibrating mill at a charge-to-ball ratio of 1:7.

Into the resulting mixture was introduced 10–11 weight percent of a 7% solution of polyvinyl alcohol, and the desired articles were manufactured by subjecting the above composition to compression molding at a pressure of 0.7–1.0 g./cm.² The molded articles were sintered at a temperature of 1,180° C. in an oxygen atmosphere for a period of 20 hours.

The thus prepared ferrite has the following characteristics:

| At 300° K.: | At 4.2° K.: |
|---|---|
| $4\pi M = 470$–$500$ gauss | $4\pi M = 80$ gauss |
| $\Delta H = 90$–$100$ oe. | $\Delta H = 210$ oe. |
| $tg\delta_\epsilon = 0.7 \cdot 10^3$ | | wherein:

$4\pi M$ is the saturation magnetization;
$\Delta H$ is the resonance curve width;
$tg\delta_\epsilon$ is the dielectric loss angle.

A comparison of resonance curve width vs. temperature graphs for the ferrite of the invention and the $$Bi_{0.4}Ca_{2.6}Fe_{3.7}V_{1.3}O_{12}$$

ferrite having identical saturation magnetization values as shown in the figure (FIG. 1) is indicative of the superiority of the present ferrite.

We claim:
1. A ferrite having the formula $Ca_3Fe_{3.5-x}Ti_{2x}V_{1.5-x}O_{12}$ wherein $x$ is from 0.05 to 0.4.
2. A method for manufacturing ferrites which comprises preparing a mixture containing 31.0–26.3 mole percent ferric oxide, 54.0–50.8 mole percent calcium oxide, 13.1–9.3 mole percent vanadium pentoxide, and 13.6–1.8 mole percent titanium oxide, calcining said mixture at a temperature of 1,000–1,020° C. for a period of 4 hours, cooling and grinding the calcined mixture, followed by subjecting said mixture to a secondary calcination at a temperature of 1,050–1,070° C. for a period of 4 hours, cooling and grinding said twice calcined mixture, and thereafter subjecting said ground mixture to compression molding and sintering the molded material at a temperature of 1,170–1,200° C. for a period of 20 hours in an oxidizing atmosphere.

References Cited
UNITED STATES PATENTS

| | | | |
|---|---|---|---|
| 3,052,634 | 9/1962 | Jack et al. | 252—62.59 X |
| 3,072,576 | 1/1963 | Greenhouse | 252—62.59 |
| 3,268,452 | 8/1966 | Geller | 252—62.63 |

TOBIAS E. LEVOW, Primary Examiner

J. COOPER, Assistant Examiner

U.S. Cl. X.R.

252—62.56, 62.63